(12) United States Patent
Luo et al.

(10) Patent No.: US 6,172,844 B1
(45) Date of Patent: Jan. 9, 2001

(54) DOUBLE GROOVED SPACER FOR A DISC DRIVE

(75) Inventors: Erming Luo, Moore; Steven S. Eckerd; John D. Stricklin, both of Oklahoma City, all of OK (US)

(73) Assignee: Seagate Technology LLC, Scotts Valley, CA (US)

( * ) Notice: Under 35 U.S.C. 154(b), the term of this patent shall be extended for 0 days.

(21) Appl. No.: 09/333,203

(22) Filed: Jun. 15, 1999

Related U.S. Application Data

(60) Provisional application No. 60/089,326, filed on Jun. 15, 1998.

(51) Int. Cl.[7] .................................................. G11B 17/02
(52) U.S. Cl. ............................................................. 360/98.08
(58) Field of Search ........................................... 360/98.08

(56) References Cited

U.S. PATENT DOCUMENTS

| | | |
|---|---|---|
| 4,754,351 | 6/1988 | Wright . |
| 4,819,105 | 4/1989 | Edwards . |
| 5,006,942 | 4/1991 | Brooks et al. . |
| 5,274,517 | 12/1993 | Chen . |
| 5,295,030 | 3/1994 | Tafreshi . |
| 5,333,080 | 7/1994 | Ridinger et al. . |
| 5,452,157 | 9/1995 | Chow et al. . |
| 5,504,638 | 4/1996 | Kinoshita et al. . |
| 5,517,376 | 5/1996 | Green . |
| 5,528,434 | 6/1996 | Bronshvatch et al. . |
| 5,600,512 | 2/1997 | Radwan et al. . |
| 5,663,851 | 9/1997 | Jeong et al. . |
| 5,701,219 | 12/1997 | Shafe' . |
| 5,875,171 | * | 2/1999 | Albrecht et al. .................. 360/98.08 |

* cited by examiner

*Primary Examiner*—Robert S. Tupper
(74) *Attorney, Agent, or Firm*—Crowe & Dunlevy

(57) ABSTRACT

The present invention provides a double grooved spacer for reducing coning of discs. A double grooved spacer includes a body portion with a plurality of spring flanges radially extending therefrom to form an inner radial groove and an outer radial groove. The body portion in conjunction with the plurality of spring flanges form a generally I-shaped cross-section. The double grooved spacer further includes circumferentially extending contact nodes disposed on the spring flanges so that the clamping force is localized at selected positions on the discs and the double grooved spacers to provide uniform distribution of the clamping force within the disc stack.

11 Claims, 3 Drawing Sheets

DOUBLE GROOVED SPACER FOR A DISC DRIVE

RELATED APPLICATIONS

This application claims the benefit of U.S. Provisional Application Ser. No. 60/089,326 filed Jun. 15, 1998.

FIELD OF THE INVENTION

This invention relates generally to the field of hard disc drive data storage devices and more particularly, but not by way of limitation, to a disc stack assembly having improved clamp force distribution.

BACKGROUND OF THE INVENTION

Data storage devices of the type known as "Winchester" disc drives are well known in the industry. Such devices magnetically record digital data on a plurality of circular, concentric data tracks on the surfaces of one or more rigid discs. The discs are typically mounted for rotation on the hub of a brushless direct current spindle motor. In disc drives of the current generation, the discs are rotated at speeds of up to 10,000 revolutions per minute.

Data are recorded to and retrieved from the discs by an array of vertically aligned read/write head assemblies, or heads, which are controllably moved from track to track by an actuator assembly. Each head typically comprises electromagnetic transducer read and write elements which are carried on an air bearing slider. The slider acts in a cooperative hydrodynamic relationship with a thin layer of air dragged along by the spinning discs to fly each head in a closely spaced relationship to the disc surface. In order to maintain the proper flying relationship between the heads and the discs, the heads are attached to and supported by head suspensions or flexures.

The actuator assembly used to move the heads from track to track has assumed many forms historically, with most disc drives of the current generation incorporating an actuator of the type referred to as a rotary voice coil actuator. A typical rotary voice coil actuator consists of a pivot shaft fixedly attached to a disc drive housing base member at a location closely adjacent an outer edge of the discs. The pivot shaft is mounted such that its central axis is normal to the plane of rotation of the discs. An actuator bearing housing is mounted to the pivot shaft by an arrangement of precision ball bearing assemblies, and supports, in turn, a flat coil which is immersed in a magnetic field of an array of permanent magnets which are fixedly mounted to the disc drive housing base member.

On the side of the actuator bearing housing opposite to the coil, the actuator bearing housing also typically includes a plurality of vertically aligned, radially extending actuator head mounting arms to which the head suspensions mentioned above are mounted. When current is applied to the coil, a magnetic field is formed surrounding the coil which interacts with the magnetic field of the permanent magnets to rotate the actuator bearing housing about the pivot shaft, thereby moving the heads across the disc surfaces.

Disc drives of the current generation are included in desk-top computer systems for office and home environments, as well as in laptop computers which, because of inherent portability, can be used wherever they can be transported. Because of this wide range of operating environments, the computer systems, as well as the disc drives incorporated in them, must be capable of reliable operation over a wide range of ambient temperatures.

Laptop computers can further be subjected to large magnitudes of mechanical shock as a result of handling. It is common in the industry, therefore, to require disc drives to operate over a wide range of ambient temperatures as well as to be able to withstand substantial mechanical shocks without becoming inoperable.

One of the areas of disc drive design which is of particular concern when considering ambient temperature variations and mechanical shock resistance is the system used to mount the discs to the spindle motor. During manufacture the discs are mounted to the spindle motor in a temperature and cleanliness controlled environment. Once mechanical assembly of the disc drive is completed, special servo-writers are used to prerecord servo information on the discs. This servo information is used during operation of the disc drive to control the positioning of the actuator used to move the read/write heads to the desired data location in a manner well known in the industry. Once the servo information has been recorded on the discs, it is essential that the servo information, and all data subsequently recorded, spin in a concentric relation to the spin axis of the spindle motor. The discs, therefore, must be mounted to the spindle motor in a manner that prevents shifting of the discs relative to the spindle motor when subjected to a mechanical shock.

Several systems for clamping discs to spindle motor hubs have been disclosed in the prior art, including U.S. Pat. No. 5,528,434, issued to Bronshvatch et al. on Jun. 18, 1996; U.S. Pat. No. 5,517,376, issued to Green on May 14, 1996; U.S. Pat. No. 5,452,157, issued to Chow et al. on Sep. 19, 1995; U.S. Pat. No. 5,333,080, issued to Ridinger et al. on Jul. 26, 1994; U.S. Pat. No. 5,274,517, issued to Chen on Dec. 28, 1993; and U.S. Pat. No. 5,295,030, issued to Tafreshi on Mar. 15, 1994, all assigned to the assignee of the present invention. In each of these disc clamping systems the spindle motor includes a disc mounting flange that extends radially from a lower end of the spindle motor hub. A first disc is placed over the hub during assembly and brought to rest on this disc mounting flange. An arrangement of disc spacers and additional discs are then alternately placed over the hub until the intended "disc stack" is formed. Finally, a disc clamp of selected construction (such as spring or shrink-fit) is attached to the spindle motor hub to exert an axially directed clamping force against the uppermost disc in the disc stack. This axial clamping force is passed through the discs and disc spacers and squeezes the disc stack between the disc clamp and the disc mounting flange.

With an industry trend toward size reduction in the overall disc drive, the size of various components within the disc drive has necessarily been reduced, including the thickness of the discs. As the discs have become thinner, the amount of clamping force that can be applied to the discs without causing mechanical distortion of the discs is limited. That is, variation in the flatness of the disc mounting flange, the discs, and the disc spacers contribute to flatness concerns of the discs relative to the heads. The yield strength of the disc material, too, affects the flatness of the joined assembly providing the disc pack. These and other factors limit the axial clamping force that can be applied using presently available techniques.

With continued demand for ever increasing levels of mechanical shock resistance, there remains a continued need for improvements in the manner in which discs are clamped to the spindle motors of disc drives. It is to such improvements that the present invention is directed.

SUMMARY OF THE INVENTION

The present invention provides a disc stack assembly having improved distribution of clamping force through the disc stack.

In accordance with preferred embodiments, a disc drive includes a number of discs which are supported on the cylindrical hub of a spindle motor to form a disc stack which is rotated at a very high rotational speed. A clamp is operably coupled to the hub outer surface, which provides a clamping force to clamp the discs for rotation with the hub while a disc support member extends from an opposite axial end of the hub. The discs are alternately stacked with interposed double grooved spacers. An annular space is provided between the inner diameters of the bores of the discs and the spacers and the outer diameter of the spindle motor hub.

Preferably, the double grooved spacers have a body portion with first and second spring flanges radially extending therefrom and toward the hub to form an interior radial groove. Third and fourth flanges extend from the body portion and away from the hub to define an exterior radial groove. The body portion in conjunction with the first, second, third and fourth flanges form a generally I-shaped cross-section.

First, second, third, and fourth circumferentially extending contact nodes are disposed on the first, second, third and fourth spring flanges, respectively, to localize the clamping force upon first and second discs. The first and second circumferentially extending contact nodes are disposed at opposing ends of the double grooved spacer so that the first and second circumferentially extending contact nodes align to contact the adjacent discs at a common radius from the central axis of the spindle motor hub. The third and fourth circumferentially extending contact nodes are disposed at opposing ends of the double grooved spacer at a selected radial distance from the first and second circumferentially extending contact nodes, so that the third and fourth circumferentially extending contact nodes align to contact the adjacent discs a larger common selected radius from the central axis. Moreover, the clamp and the disc support member contact the top-most and bottom-most discs, respectively, at selected contact points that align with the contact points of the first, second, third and fourth circumferentially extending contact nodes so that the clamping force is localized at selected positions on the discs and the double grooved spacer to minimize coning of the discs.

These and various other features as well as advantages which characterize the present invention will be apparent from a reading of the following detailed description and a review of the associated drawings.

DETAILED DESCRIPTION OF THE INVENTION

Figure 1:
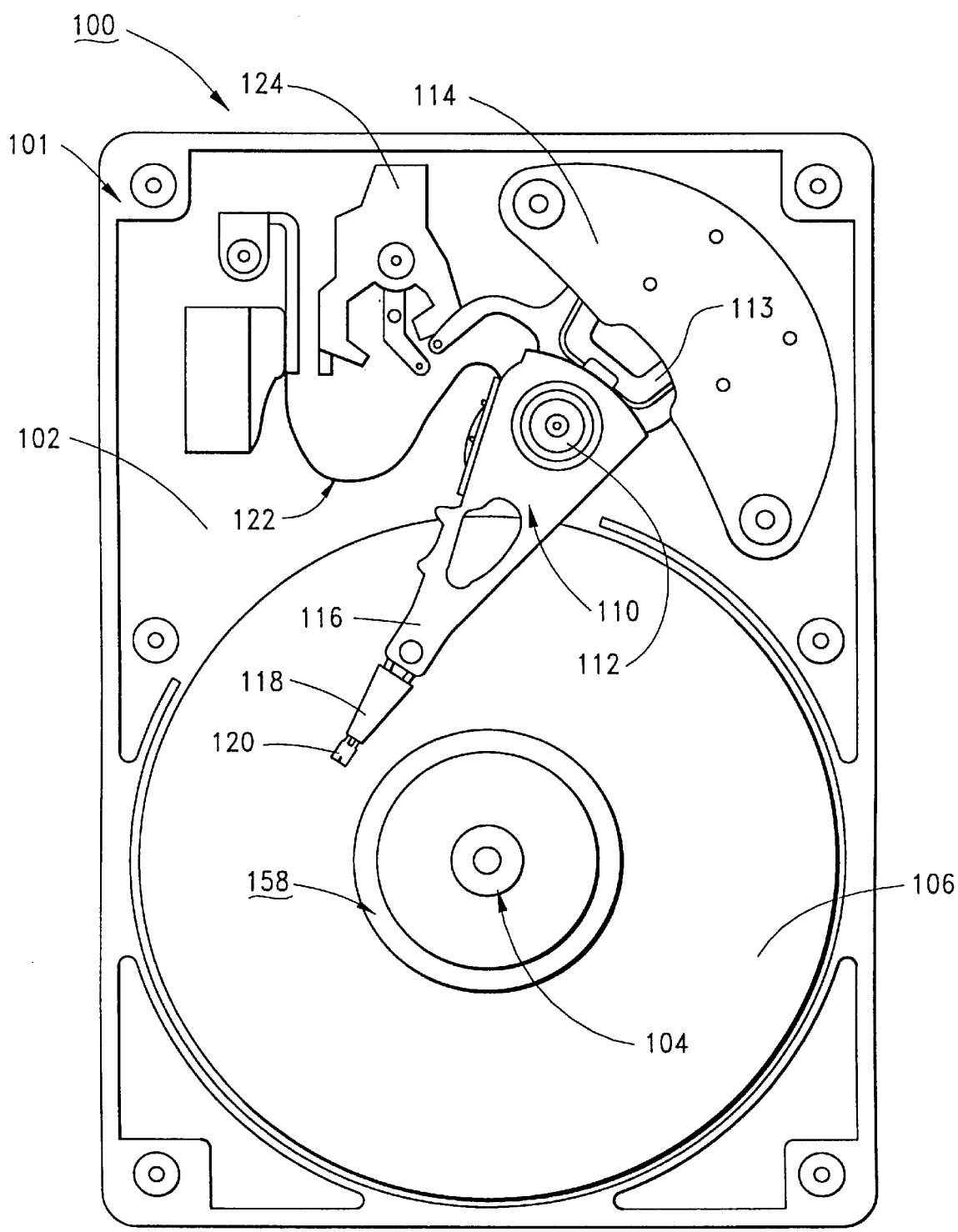
FIG. 1 is a top plan view of a disc drive constructed in accordance with preferred embodiments of the present invention.

In order to set forth a detailed description of various presently preferred embodiments of the present invention, reference is first made to FIG. 1 which shows a top plan view of a disc drive 100 used to store computer data. The disc drive 100 includes a head-disc assembly (HDA) 101 and a printed wiring assembly (PWA) which is mounted to the underside of the HDA. Although not visible in FIG. 1, it will be understood that the PWA is used to control the operation of the HDA 101.

A top cover (omitted in FIG. 1) mates with a base deck 102 to provide a controlled environment for the HDA 101. A spindle motor (generally designated at 104) is supported by the base deck 102 and rotates a plurality of axially aligned discs 106 at a constant high speed.

The discs 106 include recording surfaces (not separately identified in FIG. 1) to which user data are written by way of a rotary actuator 110, which rotates about a cartridge bearing assembly 112 in response to the application of current to a coil (113, a portion of which is shown in FIG. 1) of a voice coil motor (VCM) 114. The actuator 110 includes a plurality of rigid arms 116, each of which supports a corresponding flexible suspension assembly 118. Each suspension assembly 118 in turn supports a head 120 over each of the respective recording surfaces of the discs 106 by an air bearing established by air currents set up by the high speed rotation of the discs 106. It will be noted that the suspension assemblies 118 provide spring forces which urge the heads 120 toward the respective disc surfaces, and the heads 120 are provided with aerodynamic features that fly the heads 120 over the disc surfaces in a highly stable manner.

A flex circuit assembly 122 facilitates electrical interconnection between the actuator 110 and the disc drive PWA. A latch 124 secures the actuator 110 when the disc drive 100 is deactivated, allowing the heads 120 to safely come to rest upon landing zones (not separately identified) located at the innermost radii of the discs 106. The landing zones are preferably texturized to prevent stiction forces from undesirably adhering the heads 120 to the landing zones.

Figure 2:
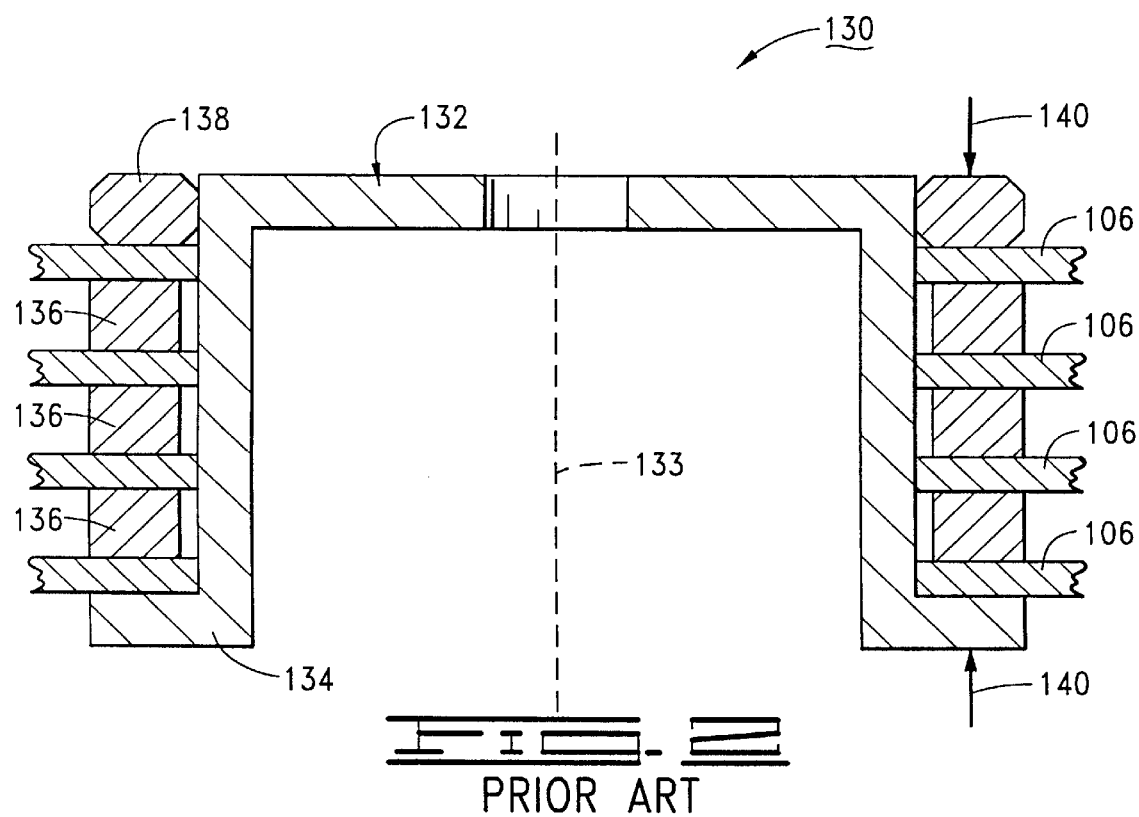
FIG. 2 is an elevational, cross-sectional view of a disc stack of a prior art disc drive showing alternately spaced discs and spacers supported on a hub of a spindle motor.

Referring now to FIG. 2, shown therein is an elevational, cross-sectional view of portions of a prior art spindle motor assembly 130 which utilizes axial loading to secure the discs 106. As interior portions of the spindle motor 130 arc not germane to the present discussion, for purposes of clarity such have been omitted from FIG. 2.

A rotatable hub 132 of the spindle motor 130 rotates about a central axis 133 and includes a radially extending disc support flange 134. A plurality of discs 106 (nominally identical to the discs of FIG. 1) and disc spacers 136 are arranged about an outer hub surface (not designated) to form a disc stack. The disc stack is assembled by placing a first one of the discs 106 over the hub 132 to rest against the disc support flange 134. Disc spacers 136 and discs 106 are alternately added to the stack until a desired number of discs 106 have been positioned (four in this example). A disc clamp 138 is then assembled to the upper end of the hub 130 to complete the assembly.

In FIG. 2, the disc clamp 138 is a "shrink-fit" clamp which has an inner diameter that is nominally smaller that the outer diameter of the hub 132. Assembly is accomplished by heating the clamp 138 so that thermal expansion permits the clamp 138 to pass over the hub 132. A desired magnitude of axial loading is applied to the disc clamp 138 while the clamp 138 is allowed to cool and shrink fit onto the hub 132. Other examples of disc clamp configurations include spring clamps, such as discussed in previously mentioned U.S. Pat. Nos. 5,274,517 and 5,295,030.

The axial clamping forces applied by the disc clamp 138 and the disc support flange 134 are schematically illustrated by vectors 140. It will be noted that the selected material and geometry of the disc clamp 138 will generally determine the maximum amount of axial clamping force that can be exerted by the clamp. A drawback to such a clamping methodology is the limitation in the amount of axially directed clamping force that can be provided without deformation or damage to the disc stack. For example, concentrated forces upon the disc stack can cause severe disc deformation such as coning (cupping) of the discs.

Figure 3:
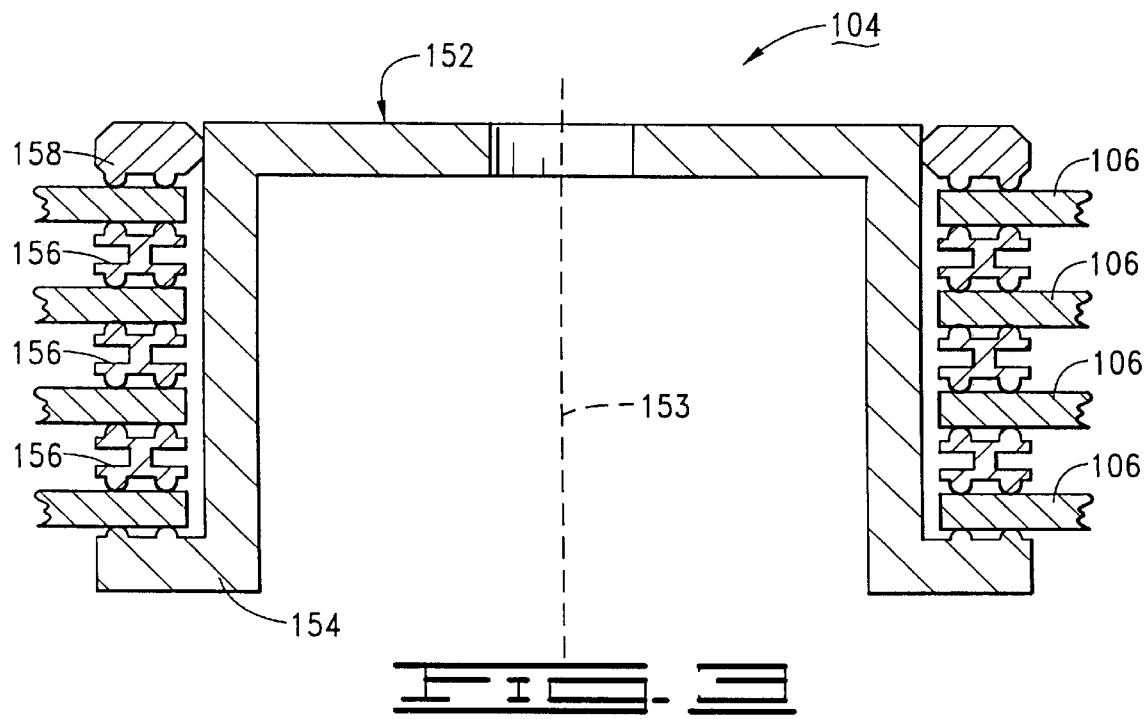
FIG. 3 is an elevational, cross-sectional view of the spindle motor of FIG. 1 illustrating the double grooved spacers of the present invention.

FIG. 3 provides a cross-sectional, elevational view of a disc stack constructed in accordance with preferred embodiments of the present invention to provide more even distribution of the clamping force within the disc stack. The spindle motor 104 includes a rotatable spindle motor hub 152 which is configured for rotation about the central axis 153. A disc support member 154 radially extends from one axial end of the rotatable spindle motor hub 152 to support the discs 106. Double-grooved spacers 156 are alternately stacked with the discs 106 to provide inter-disc spacing as well as providing more even distribution of clamping force through the disc stack. It should be noted that the number of discs 106 and double-grooved spacers 156 may vary as desired.

A disc clamp 158 is attached to the spindle motor hub 152 in the manner described above for disc clamp 138. The disc clamp 158 and the disc support member 154 cooperate to clamp the discs 106 and the double-grooved spacers 156 onto the spindle motor hub 152. The discs 106 and the double-grooved spacers 156 are disposed about the spindle motor hub 152 so that an annular space exists between the inner diameters of the discs 106, the double-grooved spacers 156, and the outer surface of the spindle motor hub 152.

Figure 4:
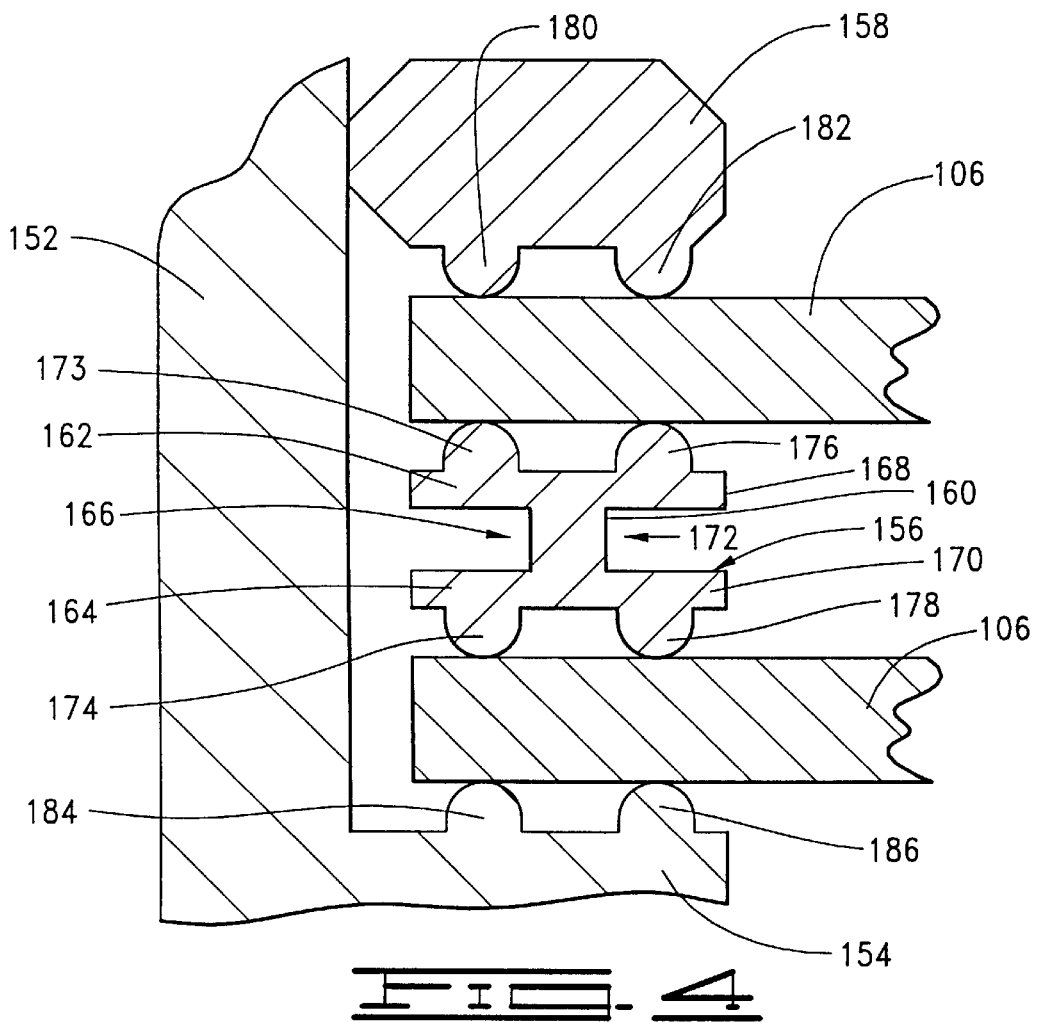
FIG. 4 illustrates various features of the double grooved spacers of FIG. 3 in greater detail.

As shown in FIG. 4, each double-grooved spacer 156 includes a body portion 160 which extends about the spindle motor hub 152. The body portion 160 has first and second spring flanges 162, 164 which radially extend from the body portion 160 and toward the outer surface of the spindle motor hub 152 to form an interior groove 166 in the double-grooved spacer 156. The first and second spring flanges 162. 164 are configured at opposing surfaces of the double-grooved spacer 156 so that the first and second spring flanges 162, 164 are at a top and bottom position on the double-grooved spacer 156. The interior groove 166 faces the outer surface of the spindle motor hub 152.

Third and fourth spring flanges 168, 170 radially extend from the body portion 160 and away from the outer surface of the spindle motor hub 152 to form an exterior groove 172 in the double-grooved spacer 158. The third and fourth spring flanges 168, 170 are also configured at opposing surfaces of the double-grooved spacer 156 at an opposite radial end of the body portion 160. It should be noted that the body portion 160 and the first, second, third and fourth flanges 162,164 168, and 170, form a generally I-shaped cross-section.

Figure 5:
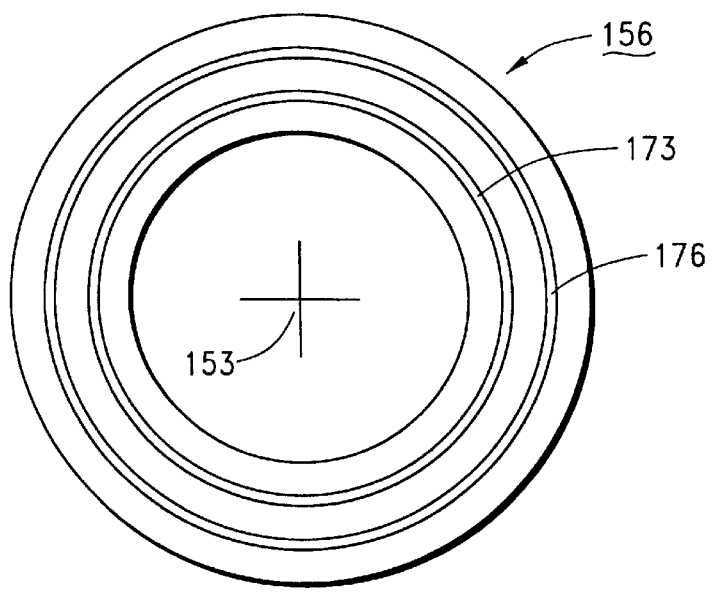
FIG. 5 is a top plan view of a selected double grooved spacer from FIGS. 3 and 4.

Circumferentially extending contact nodes (also referred to as bumps) are shown at 173, 174, 176, and 178 to extend from the first, second, third and fourth flanges, respectively. The bumps serve to localize the clamping forces imparted on the discs 106. It should be noted that the clamp 158 includes a pair of nodes 180. 182 and the disc support member 154 includes a pair of nodes 184,186. The nodes 180, 173, 174, and 184 nominally align along a common radius from the central axis 153. Moreover, the nodes 182, 176, 178, and 186 align along a common radius from the central axis 153 at a selected radial distance from nodes 180, 173, 174, and 184 so that all of the nodes are aligned in an axial cylinder. As shown in FIG. 5, which provides a top plan view of one of the double-grooved spacer 156, the circumferentially extending nodes (only two of which are shown, 173,176) arc aligned concentrically with the outer and inner diameters of the double grooved spacer 156. It should be noted that greater numbers of contact nodes may be provided to improve balance and load distribution within the disc stack.

Returning now to FIG. 3, the configuration of the double-grooved spacer 156 provides more even distribution of the clamping force applied through the clamp 158 to the disc stack. In particular, the clamping force is localized at the aligned nodes of the clamp 158, the double-grooved spacers 156, and the disc support member 154. The concentrated clamping force (also referred to as concentrated load) applied to the first of the discs 106 is distributed to the first of the double-grooved spacers 156. The spring flanges 162, 164 cause the double-grooved spacer 156 to be highly compliant to the concentrated load applied during assembly of the disc stack at the inner radius. Moreover, the spring flanges 168, 170 cause the double-grooved spacer 156 to be highly compliant to the concentrated load applied during assembly of the disc stack at the outer radius of the double-grooved spacer 156. Therefore, the spring flanges 162 and 164 act independent of spring flanges 168 and 170 to increase the compliancy of the double-grooved spacer 156 and thus provide improved retention of the concentrated load at both the inner and outer diameters of the double-grooved spacer 156.

The configuration of the double-grooved spacer 156 distributes the concentrated load from the outer diameter to the inner diameter of the double-grooved spacer 156 to retain a portion of the concentrated load at the body portion 160. As the concentrated load is distributed to adjacent discs 106 and spacers 156 through the contact nodes, the load approaches a more uniform distribution in the disc stack. Therefore, the double-grooved spacer 156 prevents distortion of the clamp 158 or the support member 154 at the outer and inner diameters due to concentrated loads. This, in effect, allows the double-grooved spacer 156 to overcome the tendency of the discs 106 to cone or cup due to concentrated loads and thereby maintains disc flatness.

Providing bumps 176 and 178 at the outer diameter and bumps 173, 174 at the inner diameter of the double-grooved spacer 156 further reduces coning of the discs 106 since concentrations of the load at the inner diameter of the discs 106 are readily distributed through the disc stack. Moreover, localizing the contact points between the clamp 158, discs 106, double-grooved spacers 156, and the disc support member 155 through the contact nodes provides a high degree of predictability in determining where the concentrated load will be located on the discs 106 in the disc stack. Such predictability reduces the variation of the concentration of the load on the discs 106 due to manufacturing tolerances and temperature variations in the disc stack to allow a higher degree of consistency in the manufacture of the disc stack.

In accordance with the foregoing discussion, it will now be recognized that the present invention is directed to a disc drive having improved clamp load distribution.

As exemplified by the preferred embodiment, a double-grooved spacer 156 is provided in a disc drive 100 to improve clamp load distribution within a disc stack to prevent discs 106 from coning. Tile disc drive 100 has data storage discs 106 in the form of a disc stack supported on a spindle motor hub 152 which spins the disc stack at a very high rotational speed. The double-grooved spacer 156 is disposed between first and second discs 106 about the spindle motor hub and has a body portion 160 with first and second spring flanges 162, 164, radially extending therefrom and toward the hub 152 to form an interior radial groove 166. Third and fourth flanges 168, 170 extend from the body portion 160 and away from the hub 152 to define an exterior radial groove 172. The body portion 160 in conjunction with the first, second, third and fourth flanges 162, 164, 168, and 170, form a generally I-shaped cross-section.

First, second, third, and fourth circumferentially extending contact nodes 173, 174, 176, and 178 are disposed on the first, second, third and fourth spring flanges 162, 164, 168, and 170, respectively, to localize the clamping force upon first and second discs 106. The first and second circumferentially extending contact nodes 173, 174 are disposed at opposing ends of the double grooved spacer 156 so that the first and second circumferentially extending contact nodes 173, 174 align to contact adjacent discs 106 at a common radius from a central axis 153 of the spindle motor hub 152. The third and fourth circumferentially extending contact nodes 176. 178 are disposed at opposing ends of the double grooved spacer 156 a selected radial distance from the first and second circumferentially extending contact nodes 173, 174, so that the third and fourth circumferentially extending contact nodes 176, 178 align to contact the adjacent discs 106 a larger selected common radius from the central axis 153. Moreover, a clamp 158 and a disc support member 154 contact the top-most and bottom-most discs, respectively, at selected contact points that align with the contact points of the first, second, third and fourth circumferentially extending contact nodes 173, 174, 176, and 178, so that the clamping force is localized at selected positions on the discs 106 and the double grooved spacer 156 to minimize coning of the discs 106.

It will be clear that the present invention is well adapted to attain the ends and advantages mentioned as well as those inherent therein. While presently preferred embodiments have been described for purposes of this disclosure, numerous changes may be made which will readily suggest themselves to those skilled in the art and which are encompassed in the spirit of the invention disclosed and as defined in the appended claims.

What is claimed is:

1. A spacer interposable between first and second discs of a disc stack, the spacer disposed about an outer hub surface of a spindle motor hub to provide uniform distribution of a clamping force applied to the disc stack, comprising:
   a body portion;
   an inner radial groove defining first and second spring flanges radially extending from the body portion toward the hub outer surface;
   an outer radial groove defining third and fourth spring flanges extending from the body portion away from the hub outer surface so that the body portion in conjunction with the first, second, third and fourth flanges form a generally I-shaped cross-section; and
   first, second, and third and fourth circumferentially extending contact nodes disposed respectively on the first, second, third and fourth spring flanges of the spindle motor hub, to localize the clamping force upon the first and second discs.

2. The spacer of claim 1, wherein the spindle motor hub comprises a clamp operably coupled to the hub outer surface at one axial end of the disc stack and a disc support member extends from an opposite axial end of the spindle motor hub, so that the clamp applies the clamping force to clamp the first and second discs to the hub for rotation with the hub.

3. The spacer of claim 2, wherein said first and second circumferentially extending contact nodes are disposed at opposing ends of the spacer on the first and second spring flanges, respectively, so that the first and second circumferentially extending contact nodes are aligned to contact the first and second discs at a common selected radius from a central axis of the spindle motor hub.

4. The spacer of claim 3, wherein said third and fourth circumferentially extending contact nodes are disposed at opposing ends of the spacer on the third and fourth spring flanges, respectively and at a selected radial distance from the first and second circumferentially extending contact nodes so that the third and fourth circumferentially extending contact nodes contact the first and second discs at a common radius from the central axis of the spindle motor hub, the common radius being larger than the common radius at which the first and second circumferentially extending contact nodes are disposed.

5. The spacer of claim 4, wherein the clamp and the disc support member contact the first and second discs, respectively, at selected contact points that align with contact points of the first, second, third and fourth circumferentially extending contact nodes so that the clamping force is localized at selected positions on the discs and the spacer to minimize coning of the discs.

6. A disc drive, comprising:
   a spindle motor having a rotatable hub having a circumferentially extending hub outer surface;
   first and second discs concentrically disposed about the hub to form a disc stack; and
   a spacer interposed between the first and second discs and disposed about the spindle motor hub to uniformly distribute a clamping force applied to the disc stack, comprising:
      a body portion;
      first and second spring flanges defining an inner radial groove, the first and second spring flanges radially extending from the body portion toward the hub outer surface;
      third and fourth spring flanges defining an outer radial groove, the third and fourth spring flanges extending from the body portion away from the hub outer surface so that the body portion, along with the first, second, third and fourth flanges form a generally I-shaped cross-section; and
      a first, second, third, and fourth circumferentially extending contact nodes disposed respectively on the first, second, third and fourth spring flanges, respectively, to localize the clamping force at selected locations on the first and second discs.

7. The disc drive of claim 6, wherein the spindle motor hub comprises a clamp operably coupled to the hub outer surface at one axial end of the disc stack and a disc support member extends from an opposite axial end of the spindle motor hub, so that the clamp applies the clamping force to clamp the first and second discs to the hub for rotation with the hub while the disc support member supports the second disc.

8. The disc drive of claim 7, wherein said first and second circumferentially extending contact nodes are disposed at opposing ends of the spacer on the first and second spring flanges, respectively, so that the first and second circumferentially extending contact nodes are aligned to contact the first and second discs at a common selected radius from a central axis of the spindle motor hub.

9. The disc drive of claim 8, wherein said third and fourth circumferentially extending contact nodes arc disposed at opposing ends of the spacer on the third and fourth spring flanges, respectively, and at a selected radial distance from the first and second circumferentially extending contact nodes so that the third and fourth circumferentially extending contact nodes are aligned to contact the first and second discs at a common radius from the central axis of the spindle motor hub, the common radius being larger than the common radius at which the first and second circumferentially extending contact nodes are disposed.

10. The disc drive of claim 9, wherein the clamp and the disc support member contact the first and second discs, respectively, at selected contact points that align with contact points of the first, second, third and fourth circumferentially extending contact nodes so that the clamping force is localized at selected positions on the discs and the spacer to reduce coning of the discs.

11. A disc drive, comprising:

first and second discs disposed about a spindle motor hub; and spacing means for establishing an inter-disc spacing between the first and second discs, which provides uniform distribution of a clamping force.

* * * * *

UNITED STATES PATENT AND TRADEMARK OFFICE
CERTIFICATE OF CORRECTION

PATENT NO. : 6,172,844 B1
DATED : January 9, 2001
INVENTOR(S) : Erming Luo, Steven S. Eckerd, John D. Stricklin It is certified that error appears in the above-identified patent and that said Letters Patent is hereby corrected as shown below:

Column 6,
Line 64, replace "Tile disc drive 100" with -- The disc drive 100 --.

Column 7,
Line 57, replace "first, second, and third and fourth" with -- first, second, third and fourth --.

Signed and Sealed this

Nineteenth Day of March, 2002

Attest:

JAMES E. ROGAN
Attesting Officer   Director of the United States Patent and Trademark Office